United States Patent
Sultan et al.

(10) Patent No.: US 8,421,589 B2
(45) Date of Patent: Apr. 16, 2013

(54) DUAL PURPOSE WIRELESS DEVICE, WHEREIN VEHICLE CONTROLS DEPEND ON DEVICE LOCATION

(75) Inventors: Michel F. Sultan, Troy, MI (US); Todd P. Oman, Greentown, IN (US); Dale L. Partin, Ray Township, MI (US); Paul J. Ainslie, Indianapolis, IN (US)

(73) Assignee: Delphi Technologies, Inc., Troy, MI (US)

( * ) Notice: Subject to any disclaimer, the term of this patent is extended or adjusted under 35 U.S.C. 154(b) by 686 days.

(21) Appl. No.: 12/360,530

(22) Filed: Jan. 27, 2009

(65) Prior Publication Data

US 2010/0188248 A1    Jul. 29, 2010

(51) Int. Cl.
*G05B 19/00* (2006.01)
*B60R 25/10* (2006.01)

(52) U.S. Cl.
USPC ............ 340/5.27; 340/426.13; 340/426.14; 340/426.15; 340/426.16; 340/426.17; 340/5.2; 340/5.72; 701/2

(58) Field of Classification Search ............ 340/426.13–426.17, 5.2, 5.72; 701/2

See application file for complete search history.

(56) References Cited

U.S. PATENT DOCUMENTS

| | | | | |
|---|---|---|---|---|
| 5,751,073 A | * | 5/1998 | Ross | 307/10.5 |
| 6,060,981 A | * | 5/2000 | Landes | 340/426.12 |
| 6,718,240 B1 | * | 4/2004 | Suda et al. | 701/36 |
| 7,301,442 B2 | * | 11/2007 | Kolpasky et al. | 340/426.13 |
| 2006/0114100 A1 | * | 6/2006 | Ghabra et al. | 340/5.61 |
| 2007/0296562 A1 | * | 12/2007 | Ghabra | 340/426.36 |

* cited by examiner

*Primary Examiner* — Daniel Wu
*Assistant Examiner* — John Bamert
(74) *Attorney, Agent, or Firm* — Thomas N. Twomey

(57) ABSTRACT

A communications system utilizing a portable communications device for controlling functions in a vehicle includes a first display for controlling vehicle operating functions and a first transceiver connected to the first display device. A multifunctional control switch is connected to the first display device, while a second transceiver is used for communicating with either the first transceiver or a remote keyless entry (RKE) receiver depending upon whether the second transceiver is located inside or outside the vehicle. The second transceiver operates to configure operational parameters of the display device when those controls have not been readily integrated into the vehicle center stack.

9 Claims, 5 Drawing Sheets

| REPRESENTATIVE FUNCTIONS | | FUNCTIONS OF INTEREST TO DRIVER OUTSIDE THE CAR & TO PASSENGER | FUNCTIONS | |
|---|---|---|---|---|
| | | | FOR DRIVER OUTSIDE CAR | PASSENGER INSIDE CAR |
| CONTROL | | REMOTE START | ✗ | |
| | | KEYLESS START | ✗ | ✗ |
| | | DOOR/TRUNK/LIFTGATE LOCK/UNLOCK | ✗ | ✗ |
| | | WINDOWS | ✗ | ✗ |
| | | SEATS | ✗ | ✗ |
| | | HVAC | ✗ | ✗ |
| | | WINDSHIELD WIPERS | ✗ | |
| | | WINDSHIELD DEFROST / DE-ICE | ✗ | |
| | | INTERIOR LIGHTING | | ✗ |
| | | EXTERIOR LIGHTING | ✗ | ✗ |
| | | PANIC / HORN | ✗ | |
| | | AUDIO | | |
| | | NAVIGATION | | |
| INFORMATION | | INTRUSION | ✗ | |
| | | DOOR LOCK STATE | ✗ | |
| | | ENGINE RUNNING STATE | ✗ | |
| | | WEATHER CONDITIONS | ✗ | ✗ |
| | | INTERIOR TEMPERATURE | ✗ | |
| | | TRAFFIC CONDITIONS | ✗ | ✗ |
| | | FUEL LEVEL | ✗ | |
| | | TIRE PRESSURE | ✗ | |
| | | VEHICLE BATTERY STATUS | ✗ | |
| | | CAR LOCATOR | ✗ | |
| | | DEVICE BATTERY STATUS | ✗ | ✗ |
| | | PLATE, POLICY & CONTACT #'s | ✗ | |
| | | ODOMETER | | |
| | | REMOTE DIAGNOSTICS | | |

FIG. 4

DUAL PURPOSE WIRELESS DEVICE, WHEREIN VEHICLE CONTROLS DEPEND ON DEVICE LOCATION

TECHNICAL FIELD

The present invention relates generally to wireless control of automotive functionality and more particularly to a dual purpose wireless device for use in automotive applications.

BACKGROUND OF THE INVENTION

Functional displays for vehicular applications have evolved since production of the first vehicles in the initial part of the 20th Century. Control functions used in automobiles started with one or more simple switches mounted in front of the driver. Today's automobiles can now often include multiple displays, readouts, and/or control mechanisms that are ergonomically located about the driver for controlling various functions of the vehicle.

FIG. 1 illustrates a prior art block diagram illustrating the control functionality of systems used throughout a typical vehicle. The vehicle 100 includes a driver 101 and passenger 103, where both persons are typically seated behind a driver cluster 105. The driver cluster 105 is used to both control and inform the driver 101 of various control functions operating throughout the vehicle. These include an engine controller 107, ABS controller 109, as well as a light controller 111 and mirror switches 113. Further, the driver cluster 105 works to control seating operations, such as a seat control and seat switches 115, as well as door and window switches 117 and door lock 125. The door and window switches of controller 117 is also used in connection with a body controller for operating a theft alarm controller 121 as well as a theft alarm device 123.

Positioned in front of the passenger 103, a center stack controller 127 as well as an HVAC controller 129 may be positioned on that side of the dashboard since there is no room available near the driver cluster controller 105. Similarly, a center stack 131 may be used to control telematics devices, receivers, and/or navigation systems in the vehicle and may be positioned to the right of both the driver 101 and passenger 103. The telematics systems located within the center stack 131 are used in combination with any reception systems 133, denoted by their respective antennas such as GPS 135, AM/FM radio 137, cellular telephone 139, or SDARs satellite system 141. Finally, a remote keyless entry (RKE) receiver controller 143 is used in combination with a key fob 142 that works to control the door lock or other devices within the vehicle 100.

A problem associated with many of today's vehicles often is the fact that there are too many control functions included between the steering wheel, steering column, and center stack cluster in front of the driver. These functions can include such things as control of the vehicles lights, wipers, cruise control, entertainment, HVAC, navigation, and telematics. When individual control functions become too complicated to use or they are positioned in a manner that inhibits their use, this can raise safety issues as well as the driver's unwillingness to adapt to these types of situations.

SUMMARY OF THE INVENTION

An embodiment of the invention is directed to an automotive communications system utilizing a dual mode device for controlling vehicle functionality. The automotive communications system includes a human machine interface (HMI) controller having an HMI display for use by a driver. A first wireless transceiver is connected to the HMI controller while a second wireless transceiver is operable in a first mode outside the vehicle and a second mode inside the vehicle for communicating with the first wireless transceiver or a remote keyless entry (RKE) transceiver. The first mode operates to control a first predetermined set of vehicle functions while the second mode operates to control a second predetermined set of vehicle functions. These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIG. 4 illustrates a table showing various functions that can be controlled by the dual mode communication device.

Figure 1:
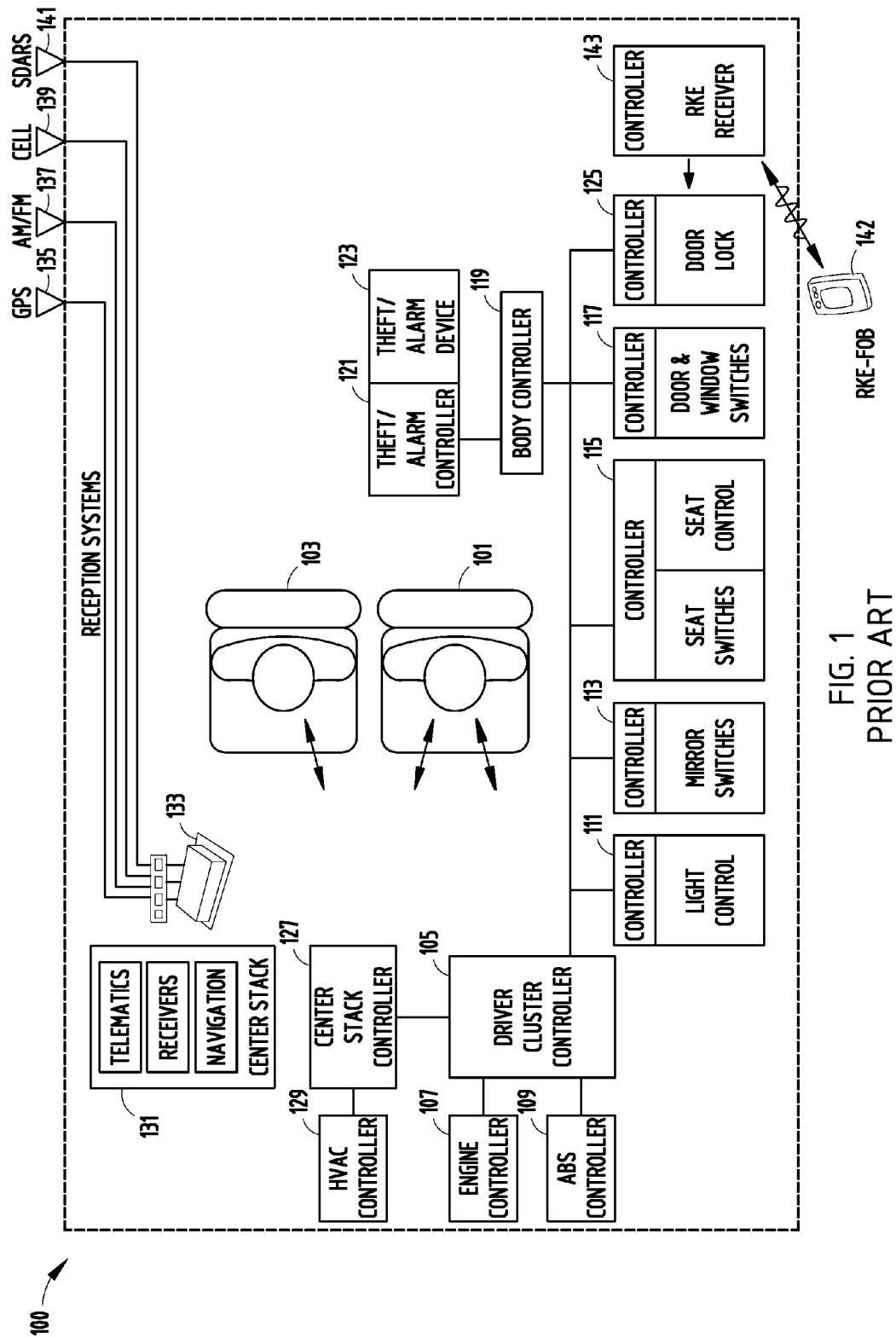
FIG. 1 illustrates a prior art block diagram illustrating the control functionality of systems used throughout a typical vehicle.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF THE PREFERRED EMBODIMENT

Before describing in detail embodiments that are in accordance with the present invention, it should be observed that the embodiments reside primarily in combinations of method steps and apparatus components related to a dual purpose wireless device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of dual purpose wireless device described herein. The non-processor circuits may include, but are not limited to, a radio receiver, a radio transmitter, signal drivers, clock circuits, power source circuits, and user input devices. As such, these functions may be interpreted as steps of a method to perform a dual purpose wireless device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches can also be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is directed to an automotive electrical and electronic architecture that uses an integrated human-machine interface (HMI). The HMI enables the driver to interact with on-board and wireless computer systems through a single common interface that includes a reconfigurable cluster display and a multi-functional switch. This interface can account for all controls that are normally located in a typical center stack, including multimedia and the heating ventilation and air conditioning (HVAC) controls. From a driver's perspective, there will be no need then to preserve the center stack controls. Elimination of the center stack controls can pose a problem for the front seat passenger in that they will lose the ability to control multimedia and HVAC systems. Potential solutions include keeping the center stack controls or duplicating the new driver HMI interface in front of the passenger. These solutions are not often desirable because of system redundancy, prime real estate usage, and added cost. Furthermore, marketing studies have shown that passenger side displays are not desirable. It is also anticipated that future customers will desire more functions from their key fob, including the ability to interrogate remotely the status of different vehicle functions. This would require upgraded key fobs with bidirectional capability and a display preferably.

Most of the control and functionality that will be needed by front seat passengers are similar to those that will be needed for future key fobs. Furthermore, most of these functions will also be needed by the driver while inside the vehicle and will be accommodated by the in-vehicle driver HMI system. Therefore, an embodiment of the invention works to provide original equipment manufacturers (OEMs) and customers a system solution through the development of a wireless device that addresses the requirements of both the front seat passenger controls and future key fob functions, in conjunction with the driver HMI system, in a way that avoids redundancy and reduces overall system cost. The invention is used both by the driver when outside the vehicle, and by the front seat passenger inside the vehicle. Accordingly, there is no conflict of usage between two modes of operation.

Figure 2:
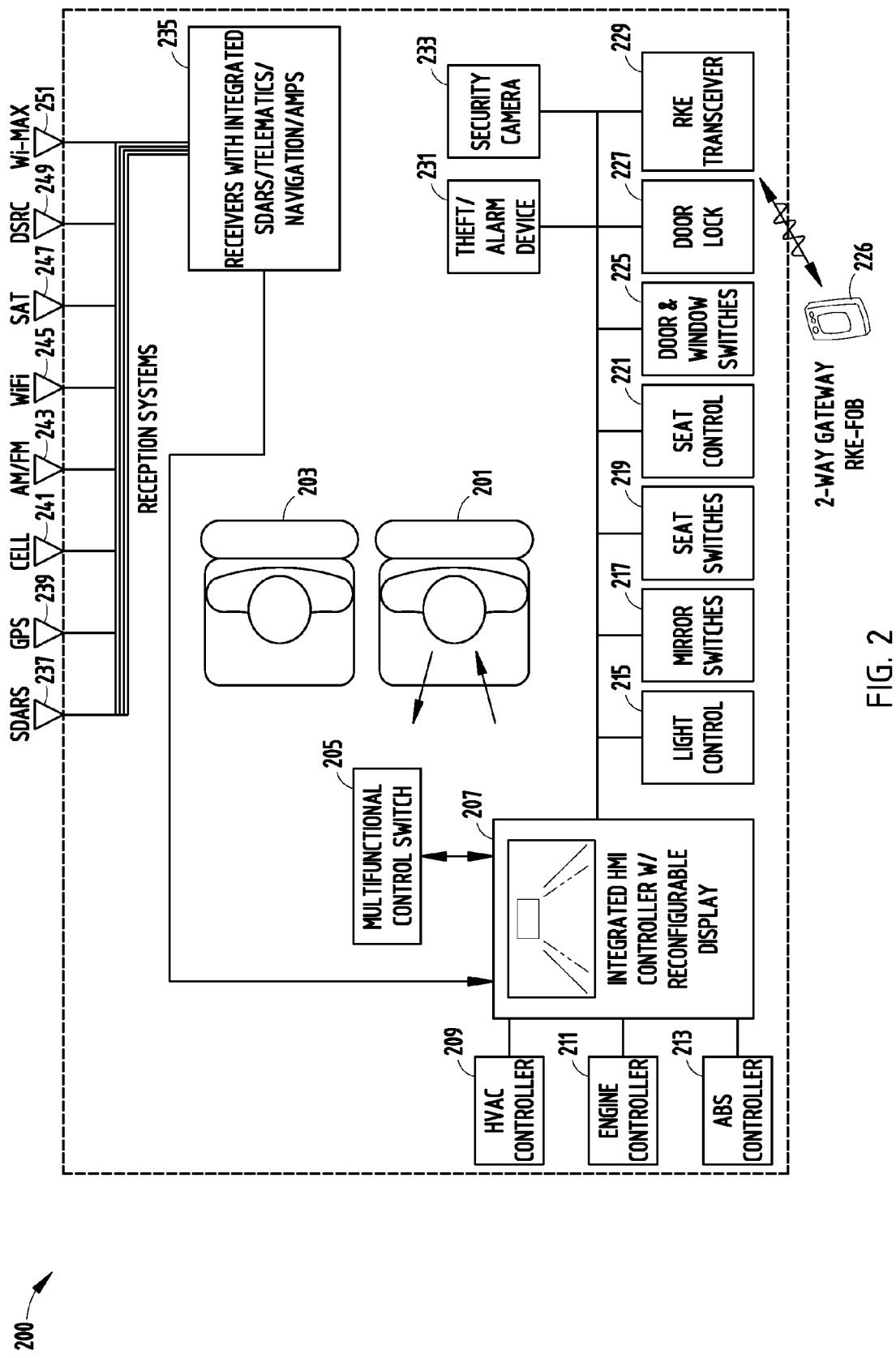
FIG. 2 is block diagram showing a dual purpose wireless device in accordance with an embodiment of the invention.

FIG. 2 is block diagram illustrating a communications system utilizing a portable communications device in accordance with an embodiment of the invention. A vehicle 200 includes a driver 201 and passenger 203 positioned within the cab of the vehicle. The multifunctional control switch 205 and integrated HMI controller with configurable display 207 is positioned substantially in front of the driver 201 and is configurable so as to control the many functions throughout the vehicle. These functions include HVAC controller 209, engine controller 211, and the ABS controller 213. The integrated HMI controller with configurable display 207 further includes an electrical control bus for controlling such functions as the light control 215, mirror switches 217, seat switches 219, seat control 221, and the door and window switches 225. Further connected to the electrical bus is a door lock 227 that works with a theft alarm device 231. A remote keyless entry (RKE) transceiver 229 further is used to control such devices as a security camera 233. Those skilled in the art will also recognize that the RKE transceiver 229 may also function as a transceiver if two-way communications with the two-way gateway RKE fob 226 are implemented. Various receivers with integrated satellite digital audio radio service (SDAR)/telematics/navigation amplifiers 235 are connected to the integrated HMI controller with reconfigurable display 207. These receivers and accompanying antennas are used in connection with telemetric systems, such as SDARs 237, global positioning system (GPS) 239, cellular telephone 231, AM/FM radio 243, WIFI™ 245, satellite (SAT) 247, dedicated short range communication (DSRC) 249, and WIMAX® 259.

Thus, an embodiment of the present invention utilizes a wireless device with a reconfigurable display that serves both as a key fob and as a remote control device for the front seat passenger. When outside the vehicle, the device operates as a key fob and communicates with a transceiver that is integrated in the HMI controller. When inside the vehicle, the device operates as a remote controller for the benefit of the passenger, and it also communicates with the same transceiver that is integrated in the HMI controller. The invention provides OEMs and future customers with a total systems solution for driver and passenger interactions with the vehicle in a way that reduces cost and eliminates redundancy. The integration of passenger controls and key fob functions in a single device reduces weight, volume, and clutter in the cockpit by eliminating the need for passenger controls either in the center stack or in front of the passenger. One of the reasons an invention as described herein has not existed is due to the fact that current vehicle architectures do not permit its implementation in a feasible manner. However, the invention will be enabled by future architectures that consolidate all in-vehicle function controls for the driver through the use of an integrated HMI system that consists of a reconfigurable cluster display, a multifunctional switch, and an HMI controller that interacts with all vehicle systems of interest, including multimedia, HVAC, RKE, and safety.

Figure 3:
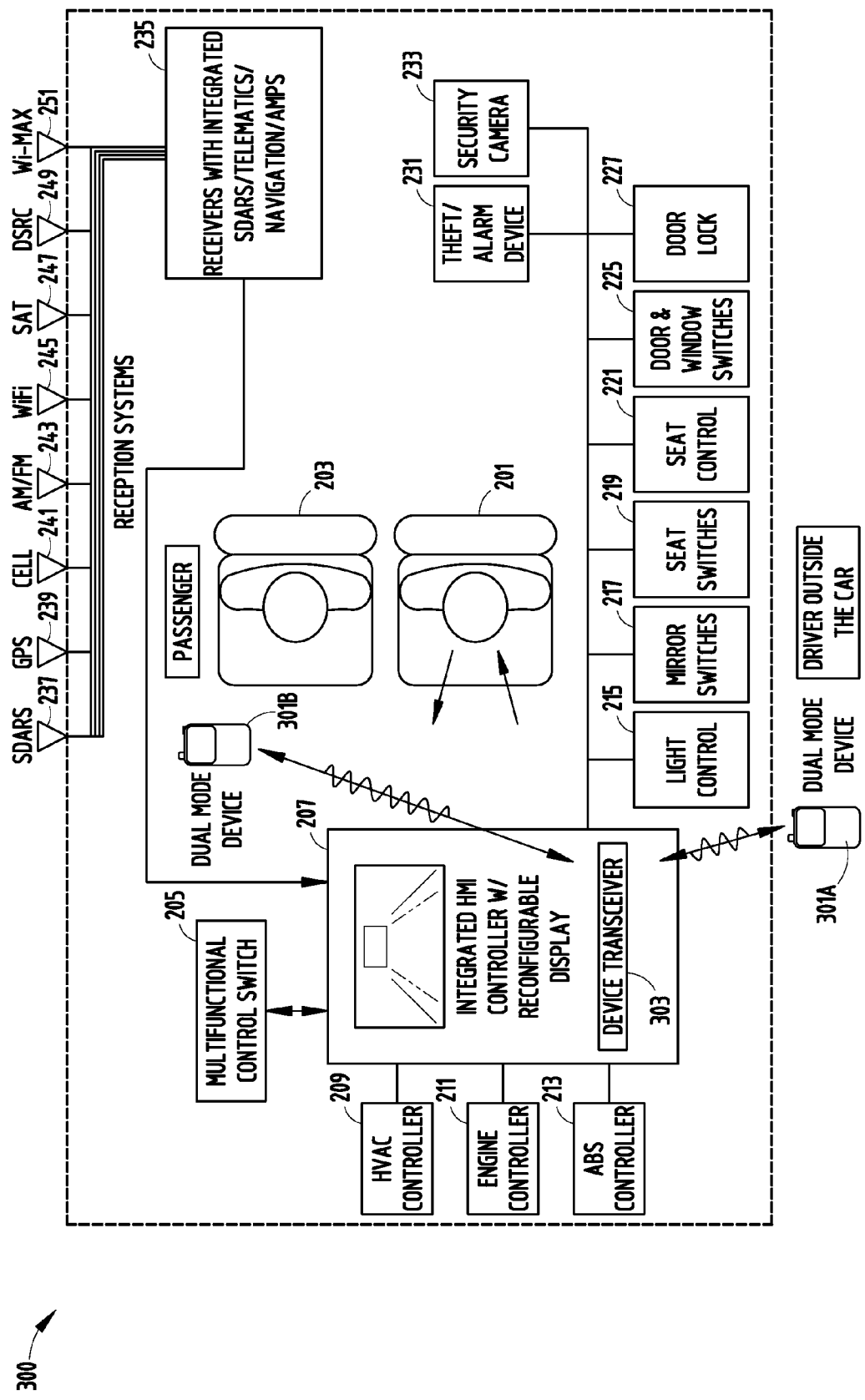
FIG. 3 illustrates a block diagram showing two embodiments of the wireless dual mode communications device and its modes of operation.

FIG. 3 illustrates a block diagram showing various embodiments of the invention illustrating its two modes of operation. When outside the vehicle 300, the driver 201 uses the dual mode device 301A as a key fob in combination with the door lock 227 and theft/alarm device 231. In addition, the dual mode device 301A communicates with a transceiver 303 integrated with the HMI controller with reconfigurable display 207. In an alternative embodiment, the transceiver 303 may be a standalone unit that communicates with the HMI controller with reconfigurable display 207 via an electrical control bus. In operation, the dual mode device 301A gains direct access and control functionality to all vehicular functions that can be controlled through the HMI controller 207. When inside the vehicle 300, the dual mode device 301B also communicates with the device transceiver.

FIG. 4 illustrates a table showing various functions available to a driver outside the car and/or passenger within the vehicle using the dual mode device 301A/310B. All of these functions that are needed by the driver 201 when outside the vehicle are already covered by the HMI controller for the benefit of the driver 201 when inside the vehicle. As seen in the table, these functions are both control- and information-related. The control functions include, but are not limited to, such operations as remote start, passive keyless start, windows, seats, HVAC, interior/exterior lighting, audio, and navigation. The information presented to the dual mode device includes, but is not limited to, intrusion, door lock state, weather conditions, fuel level, tire pressure, vehicle battery status, odometer, and remote diagnostics.

Figure 5:
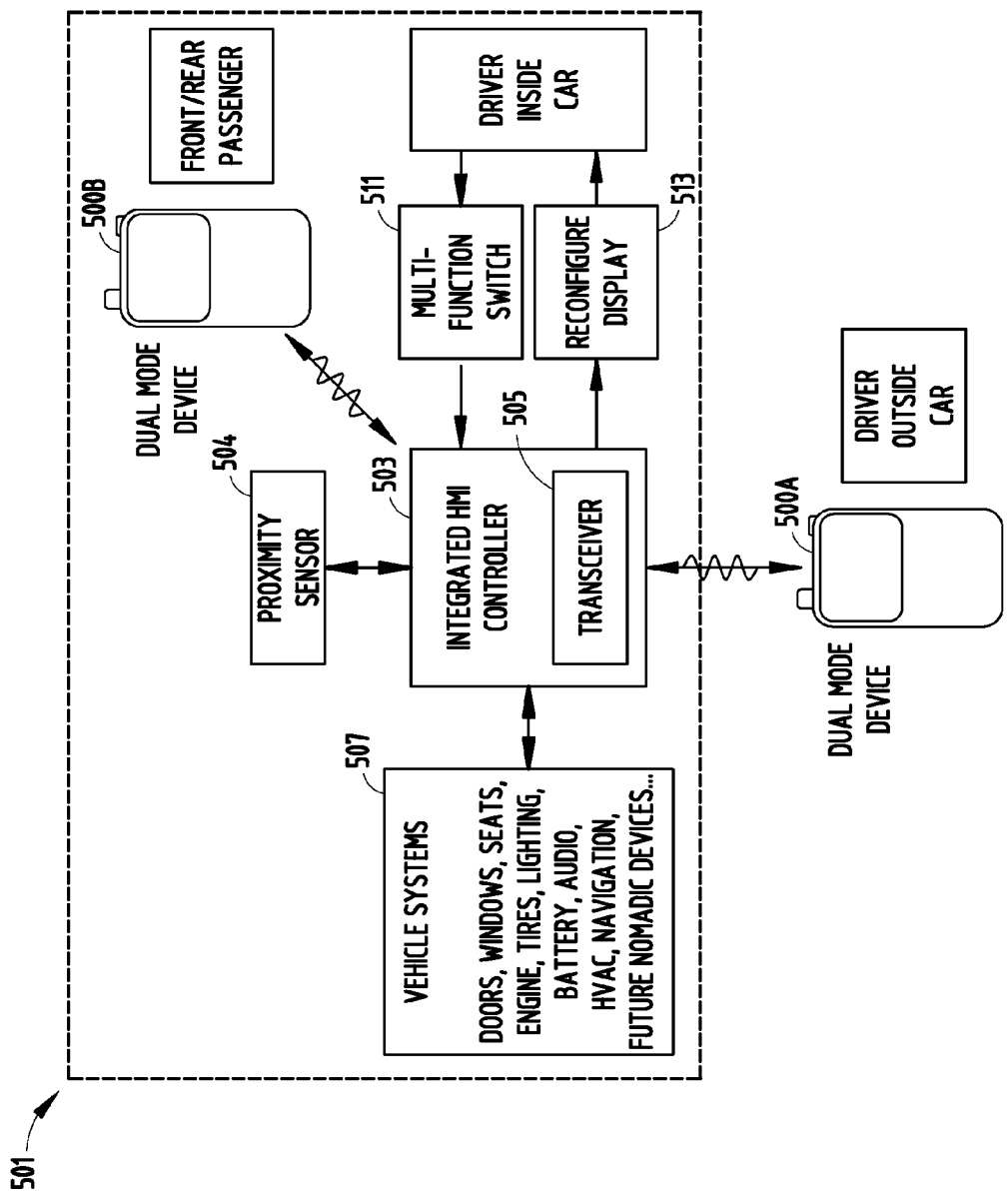
FIG. 5 illustrates a block diagram showing details of the operation of the wireless dual mode communications device.

FIG. 5 illustrates a block diagram illustrating details of the operation of the wireless dual mode communications device in accordance with an embodiment of the invention. The dual mode communications device 500 communicates with the vehicle 501 in a wireless manner. An integrated HMI controller 503 includes both a transceiver 505 as well as proximity sensor 504 that is used to determine if the dual mode communication device 500 is located either outside or within the vehicle. As noted herein, the integrated HMI controller 503 is used in connection with various enunciators and controls 507 for monitoring and controlling vehicle functionality. A multifunction switch 511 and reconfigurable display 513 are used in connection with the HMI controller 503 for allowing the driver to control vehicle functionality that is displayed within the vehicle 501. When the proximity sensor 504 determines that the dual mode device 500A/500B is within the vehicle, a different mode of functionality is provided to the user within the vehicle so that operability through the dual mode device 500A/500B is characterized based on its location. Such a proximity sensor may, for example, be based on RF signal strength, infrared transmission, ultrasound transmission, or the like. Alternatively, the proximity sensor may be a virtual sensor in which it is inferred that the dual mode device is in the vehicle if the vehicle is moving and communications are achieved between the dual mode device and the transceiver 505.

Figure 6:
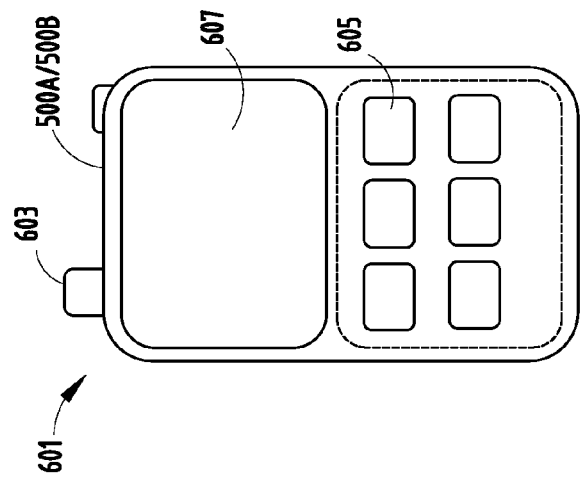
FIG. 6 illustrates a block diagram of the dual mode communications device according to an embodiment of the invention.

FIG. 6 illustrates a block diagram of the dual mode communications device 500A/500B. The device includes a display 601 such as an LCD or the like and antenna 603. Various push buttons or other keyboard controls 605 are used to control functionality of the device. In operation, a proximity sensor (not shown) interacts with the on-board transceiver 303 for determining whether the device is either inside or outside the vehicle. This enables the device to switch automatically from first or second modes depending on its location. This also enables the appropriate software and menus to be displayed on the display 601. Although the menus for the two modes of operation may be similar, they may not necessarily be identical. Some functions may be enabled in one mode but not the other. For example, for safety purposes, the passenger should not be able to modify the settings of the side or rearview mirrors. The battery of the dual mode communications device 500A/500B is rechargeable through a dock-and-charge module (not shown) located inside the vehicle. The ability to recharge the battery supply may be needed since the bi-directional ability and the display may consume relatively high amounts of battery power depending on the frequency and duration of its use. Further, a special location, such as a charging "pocket," may be provided to store the fob so that while driving in the vehicle it can be attached for example to the side of one of the front seats near the center of the vehicle. Those skilled in the art will also recognize that the use of an LCD in the display 601 is illustrative of other display technologies, such as an Organic Light Emitting Diode (OLED) display or an E-INK™ display also may be used.

An additional aspect of the invention is that entertainment functions may be incorporated in or controlled by the dual mode communications device. This may be a self-contained game that involves the display, switches, buttons, lights, buzzer, accelerometer, speaker, headphone jack, etc. that may be incorporated in the device, along with software inside the device that relates to a game, video, etc. This could be used by the passengers (not the driver) for entertainment for entertainment purposes. Further, the device could also be used for the same purpose using one or more displays in the vehicle that are not visible to the driver, and also to a sound system in the vehicle, preferably one that is audible to the passenger(s) only. This might be accomplished using headphone jacks near the passenger seats, infrared communications with headphones, or the like.

The above discussion pertains to one or more dual mode communications devices for a vehicle, one of which would be in the driver's possession. As noted above, pockets could be provided in the vehicle to store the devices that are not kept in the driver's possession. In another embodiment, a smaller fob could be used only by the driver which has key fob-related functions incorporated in it. The other fob(s) could be the full, dual mode communications devices described in this invention.

It will be understood by those skilled in the art that the word "transceiver" used in this invention in general means a bi-directional wireless communications device. However, in some embodiments, uni-directional transmission from the dual mode device to an RKE receiver and/or to a device receiver may be all that is required allowing for reduced functionality. However, the term "transceiver" is also used to encompass these more limited cases.

Thus, those skilled in the art will recognize the dual invention interacts with all on-board systems and is useful for both front seat and rear seat passengers. The invention further enables, for example, passengers to change the HVAC settings in the rearward zones of the vehicle, as well as multimedia settings without taxing the driver's attention to the driving task. The driver can override the backseat settings and/or disable the use of the dual mode device if he or she desires to do so. By having multiple key fobs, each user can personalize his or her preferences which can be automatically adjusted upon entering the vehicle. Additionally, there is the option for offering a software-only product that can be loaded onto smart phones, such as personal digital assistants (PDAs) and cellular telephones. Such phones may communicate with the vehicle using a number of radio frequency (RF) protocols, such as standard key fob frequencies, BLUETOOTH®, WIFI™, WIMAX®, or ZIGBEE®, over the cellular telephone system. To help locate lost fobs, a "finder" feature may also be included in the vehicle HMI system to cause misplaced fobs to beep and/or light up.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A communications system utilizing a dual mode device for controlling functions in a vehicle, said system comprising:

a first wireless transceiver configured to be installed in the vehicle;

a dual mode device equipped with a second wireless transceiver configured to communicate with the first wireless transceiver, said dual mode device configured to be portable with respect to the vehicle; and a controller configured to be installed in the vehicle and coupled to the first wireless transceiver, said controller configured to control a first predetermined set of vehicle functions only in the case in which the controller determines that the dual mode device is located outside the vehicle, and configured to control a second predetermined set of vehicle functions distinct from the first predetermined set of vehicle functions only in the case in which the controller determines that the dual mode device is located inside the vehicle, wherein the controller is configured to determine that the dual mode device is located outside the vehicle only in the case in which the first wireless transceiver is communicating with the second wireless transceiver and the vehicle is not moving, and wherein the controller is configured to determine that the dual mode device is located inside the vehicle only in the case in which the first wireless transceiver is communicating with the second wireless transceiver and the vehicle is moving.

2. The system of claim 1, said system further including a human machine interface (HMI) for controlling vehicle functions, said human machine interface in communication with the controller.

3. The system of claim 1, said system further including a first display for controlling the second predetermined set of vehicle functions, said first display in communication with the controller.

4. The system of claim 3, wherein the first display is reconfigurable using the dual mode device.

5. The system of claim 1, wherein the dual mode device includes a keyboard control configured to control the dual mode device.

6. The system of claim 1, wherein the dual mode device includes a second display.

7. The system of claim 1, wherein the dual mode device is configured as a key fob.

8. The system of claim 1, wherein the first predetermined set of vehicle functions is at least one selected from the group consisting of remote start, door lock, door unlock, exterior lighting, horn, window control, seat control, interior lighting, heater, ventilation and air conditioning (HVAC) system control, and window defrost.

9. The system of claim 1, wherein the second predetermined set of vehicle functions is at least one selected from the group consisting of window control, seat control, interior lighting, heater, ventilation and air conditioning (HVAC) system control, window defrost, audio system control, and navigation system control.

* * * * *